June 7, 1927.
D. M. SIX
1,631,650
LUBRICATING MEANS FOR AUTOMOBILE CHASSIS
Filed Oct. 23, 1925
2 Sheets-Sheet 1
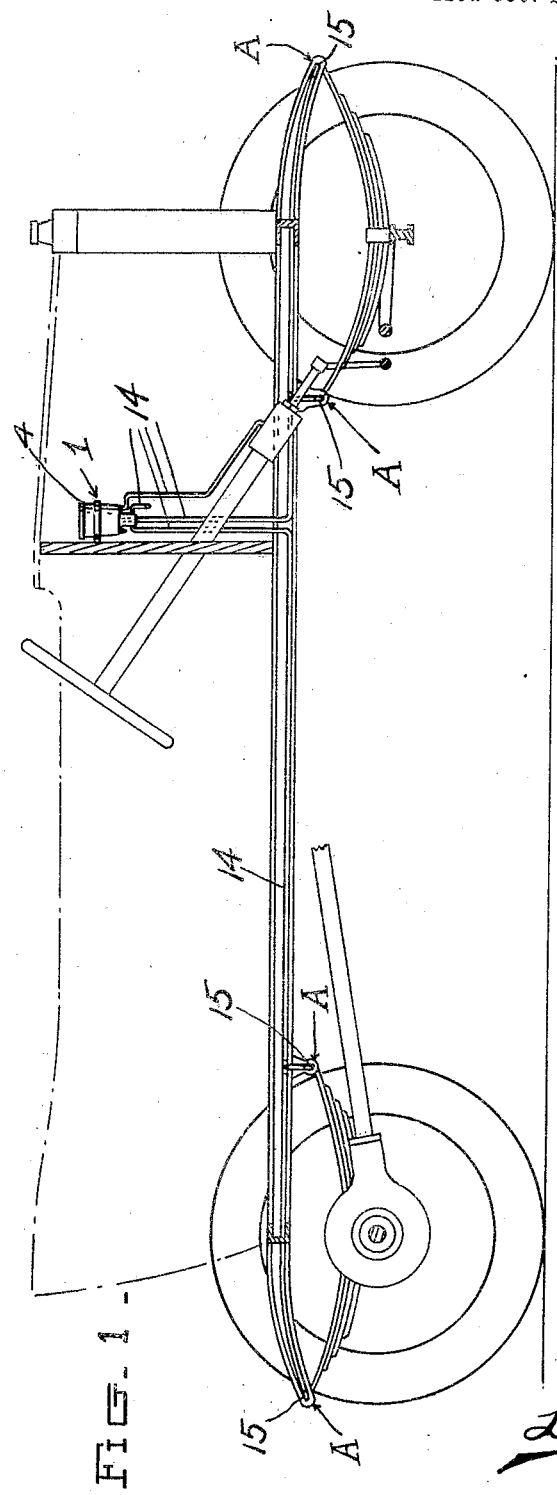
Inventor
Dale M. Six
L. B. James
Attorney

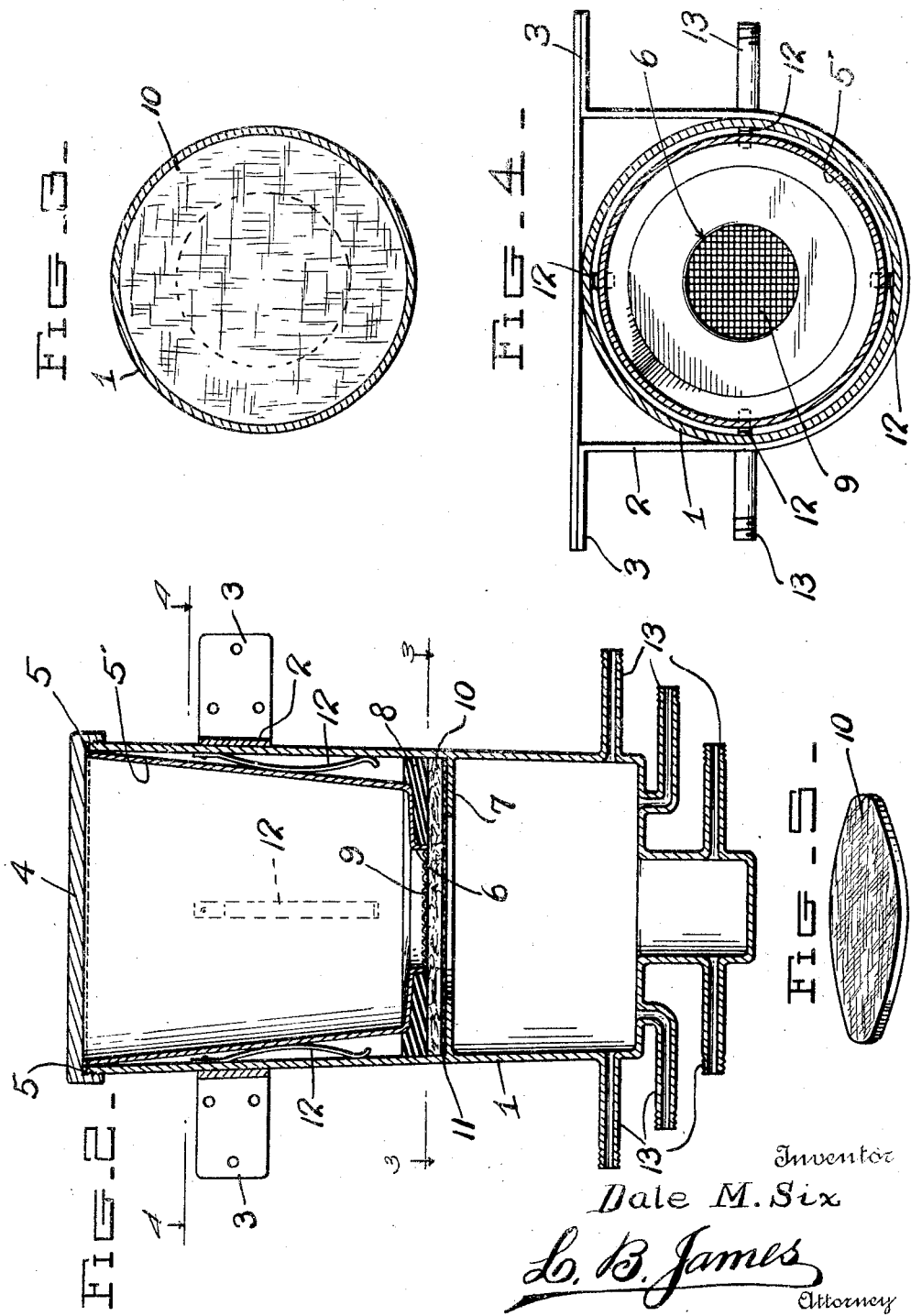

Patented June 7, 1927.

1,631,650

UNITED STATES PATENT OFFICE.

DALE M. SIX, OF LOS ANGELES, CALIFORNIA.

LUBRICATING MEANS FOR AUTOMOBILE CHASSIS.

Application filed October 23, 1925. Serial No. 64,458.

This invention relates to lubricating means for motor vehicles and the like, the general object of the invention being to provide a central reservoir for the lubricant with pipes connected thereto and leading to the different parts of the vehicle to be lubricated so that a constant supply of lubricant is fed to the parts at all times, thus eliminating the necessity of periodical attention to each individual bearing and part as is now required with the usual lubricating system.

Another object of the invention is to provide means for regulating the amount of lubricant reaching the bearing or part to be lubricated so that said part will receive the correct amount of lubricant.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Fig. 1 is a longitudinal sectional view through an automobile showing the elements of this invention in operative position thereon;

Fig. 2 is an enlarged vertical sectional view through the oil reservoir;

Fig. 3 is a sectional view on line 3—3 of Fig. 2;

Fig. 4 is a similar view on line 4—4 of Fig. 2;

Fig. 5 is a detail view of a portion of the reservoir.

Referring to the first form of the invention, 1 indicates a reservoir which may be placed at any desired point on the vehicle though it should be arranged near the center of the vehicle and so located that it can be easily replenished with lubricant. It is held in place by the semi-circular bands 2 which have their ends 3 fastened to the supporting part of the vehicle. It may be placed on the dash or instrument board, in the floor, under a seat or any other suitable place. The reservoir is provided with a top 4 which is provided with a gasket 5 to make a tight fit and the top may be hinged to the reservoir or screw threaded thereto. An oil container 5 is arranged in the upper part of the reservoir and the bottom of said container is provided with an opening 6. An annular flange 7 is formed on the interior wall of the reservoir and forms a seat for the filtering means hereinafter to be described and the partition 8 of rubber or the like with which the bottom of the container 4 engages. A screen 9 covers the opening 6 and is fastened to the bottom of the container, the partition 8 having a hole therein which registers with the hole 6. This partition separates the upper part of the reservoir from the lower part and prevents oil from entering the space between the reservoir and container. A sheet of felt or the like, indicated at 10 forms a filtering medium and this sheet rests upon a screen of fine mesh indicated at 11 and resting upon the flange 7. Springs 12 are placed in the space between the reservoir and the container and engage the container to hold the same against movement.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A lubricating reservoir of the character set forth, comprising an outer casing having supports thereon, an annular flange internally secured to the sides of the casing above the lowermost wall thereof, an oil container supported by the annular flange, a filtering member seated on the flange beneath the container, an adhesive ring seated upon the filtering member and having an aperture therein registering with an outlet aperture in the container, resilient means retaining the oil container in spaced relation to the interior walls of the casing, and nipples on the lower part of the casing.

In testimony whereof I affix my signature.

DALE M. SIX.